INVENTORS
EVON C. GREANIAS
WILLIAM W. HARDIN
BY Paul M. Brannen
AGENT

July 7, 1964 E. C. GREANIAS ETAL 3,140,466

CHARACTER RECOGNITION SYSTEM

Filed Dec. 23, 1957 10 Sheets-Sheet 2

July 7, 1964 E. C. GREANIAS ETAL 3,140,466

CHARACTER RECOGNITION SYSTEM

Filed Dec. 23, 1957 10 Sheets-Sheet 5

July 7, 1964 E. C. GREANIAS ETAL 3,140,466

CHARACTER RECOGNITION SYSTEM

Filed Dec. 23, 1957 10 Sheets-Sheet 7

July 7, 1964 E. C. GREANIAS ETAL 3,140,466

CHARACTER RECOGNITION SYSTEM

Filed Dec. 23, 1957 10 Sheets-Sheet 9

3,140,466

CHARACTER RECOGNITION SYSTEM

Evon C. Greanias, Vestal, and William W. Hardin, Endicott, N.Y., assignors to International Business Machines Corporation, New York, N.Y., a corporation of New York Filed Dec. 23, 1957, Ser. No. 704,396
9 Claims. (Cl. 340—146.3)

This invention relates to character recognition systems, and particularly to an improved character recognition system in which a plurality of primary or scanning channels are provided, sufficient to simultaneously scan horizontally a character of predetermined length located anywhere within a predetermined vertical area, and a reduced number of secondary or recognition channels are connected to the primary channels in such manner that sufficient scanning information is provided for character recognition.

The recognition of characters must provide for a certain degree of misregistration since the printing or other devices which produce the characters, as well as the scanning apparatus, cannot be held to absolute values. For example, close examination of a typed or printed line of characters will reveal that a certain amount of vertical misregistration exists between any one character and one or more of the remaining characters in the given line. In a multichannel scanning system, sufficient channels must be provided to scan a character located anywhere within the maximum limits of misregistration, but with characters of a given maximum height, it is apparent that for the scanning of any character, certain of the channels will not convey any scanning information, depending upon the location of the character. To provide a complete set of analyzing circuits for all channels requires a relatively large amount of apparatus, only a portion of which comes into play for recognizing any one character.

The present invention provides a novel solution for this problem by suitably mixing the primary or scanning channel information in a reduced number of secondary channels. Each of the secondary channels accepts information from primary channels which are spaced by intervals equal to the total number of secondary channels. The total number of secondary channels is selected to encompass the normal character height, in terms of channels, plus one additional channel, and the secondary channels are connected in consecutive order to the appropriate primary channels. The information in the secondary channels is coded in a selected manner during the scanning of each character and is then passed to suitable individual storage means for each secondary channel. The stored information is then sampled in consecutive sequence, providing phasing information, and is analyzed for characteristic sequences, one for each character or symbol. When a proper sequence is detected, a suitable output signal is provided indicative of the character or symbol sensed.

Accordingly, an object of this invention is to provide an improved character recognition system in which a plurality of parallel paths are scanned simultaneously for character information, the scanned information therefrom being supplied to a reduced number of secondary channels for subsequent analysis.

Another object of the invention is to provide an improved character recognition system in which a plurality of primary or scanning channels are provided, sufficient in number to provide closely spaced parallel scanning paths extending throughout the maximum registration zone in which the characters appear, and the outputs of which are mixed to provide data to a reduced number of secondary channels, sufficient to properly identify the characters.

A further object of the invention is to provide an improved character recognition system in which characters are scanned horizontally and simultaneously to provide encoded information which is then scanned sequentially to provide phasing information and character recognition sequences.

Yet another object of the invention is to provide an improved character recognition system particularly adapted for reading magnetized or magnetizable characters.

A further object of this invention is to provide an improved character recognition system utilizing a relatively large number of closely spaced magnetic pickup heads for scanning magnetic characters subject to alignment anywhere within the total length of the group of heads, and feeding the scanned information to a reduced number of secondary channels for subsequent analysis.

Still another object of this invention is to provide an improved channel reduction system for transmitting data which appears in any consecutive number of adjacent channels out of a large plurality of channels, to a reduced number of secondary channels, and maintaining a suitably ordered relationship for the first and last of the data in the secondary channels corresponding to the first and the last of the data in the primary channels.

Yet another object of this invention is to provide an improved channel reduction system for transmitting data in suitably ordered combination from a large number of primary channels to a reduced number of secondary channels.

Other objects of the invention will be pointed out in the following description and claims and illustrated in the accompanying drawings, which disclose, by way of examples, the principle of the invention and the best mode which has been contemplated, of applying that principle.

Figure 6A:
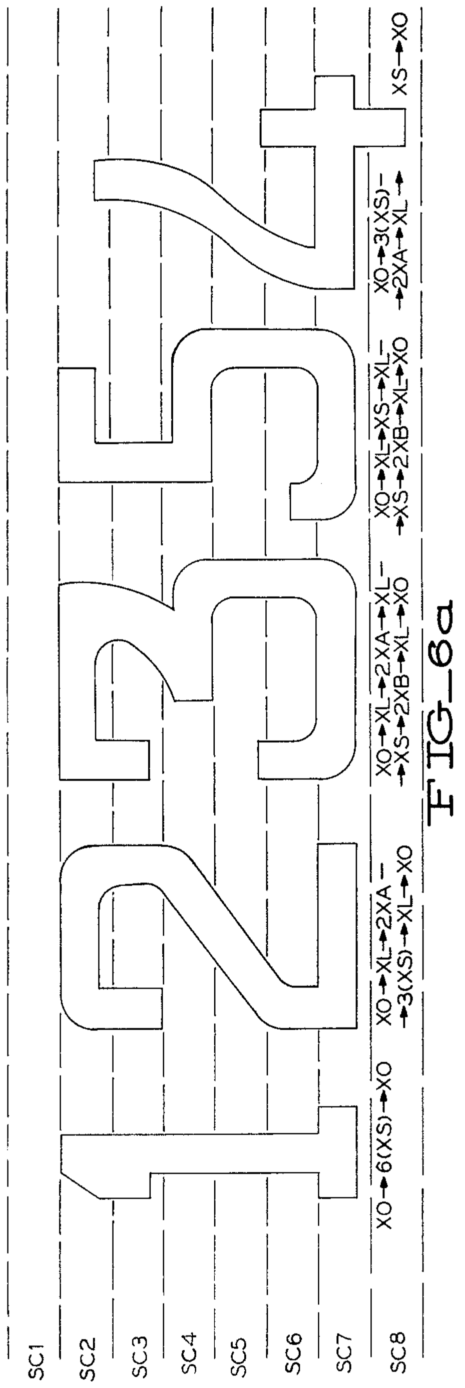
Figure 6B:
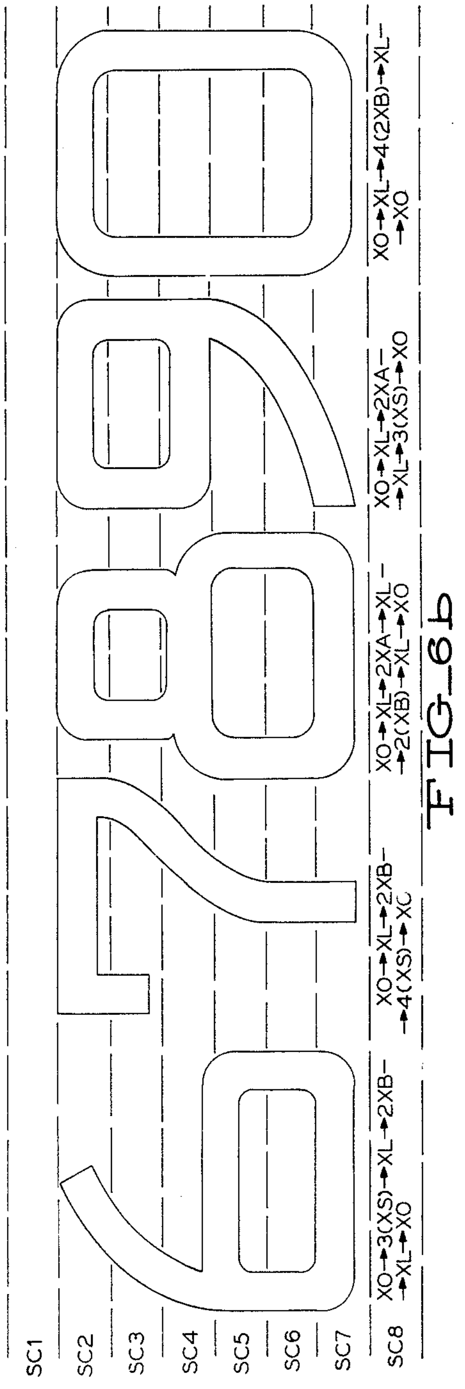

FIGS. 6*a* and 6*b* are diagrammatic illustrations of the manner in which sequences of character recognition criteria may be arranged for a set of Arabic numerals.

Figure 7:
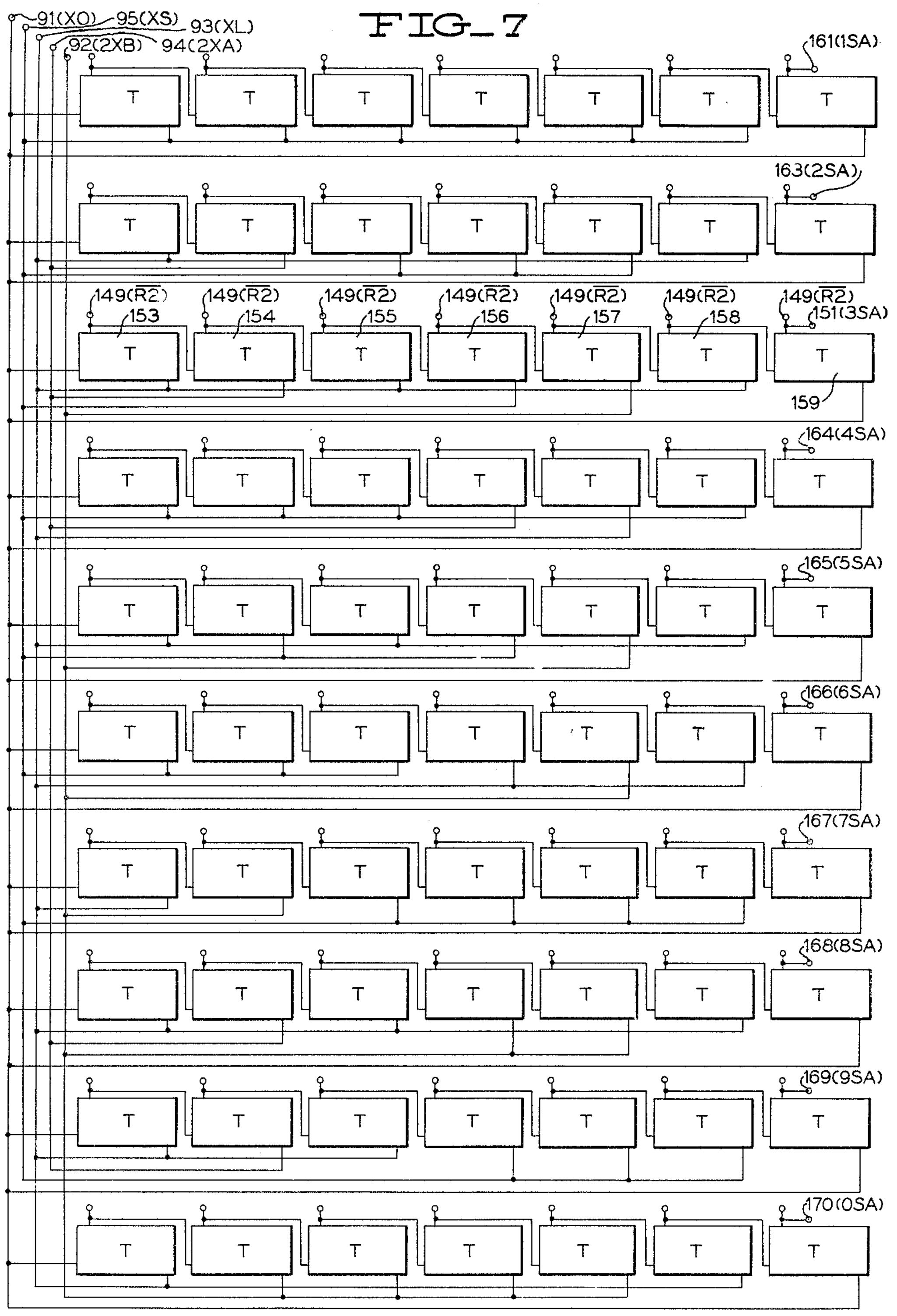

FIG. 7 is a diagrammatic illustration of a set of sequence analysis circuits which may be employed to recognize the sequences shown in FIGS. 6*a* and 6*b*.

Figure 8:
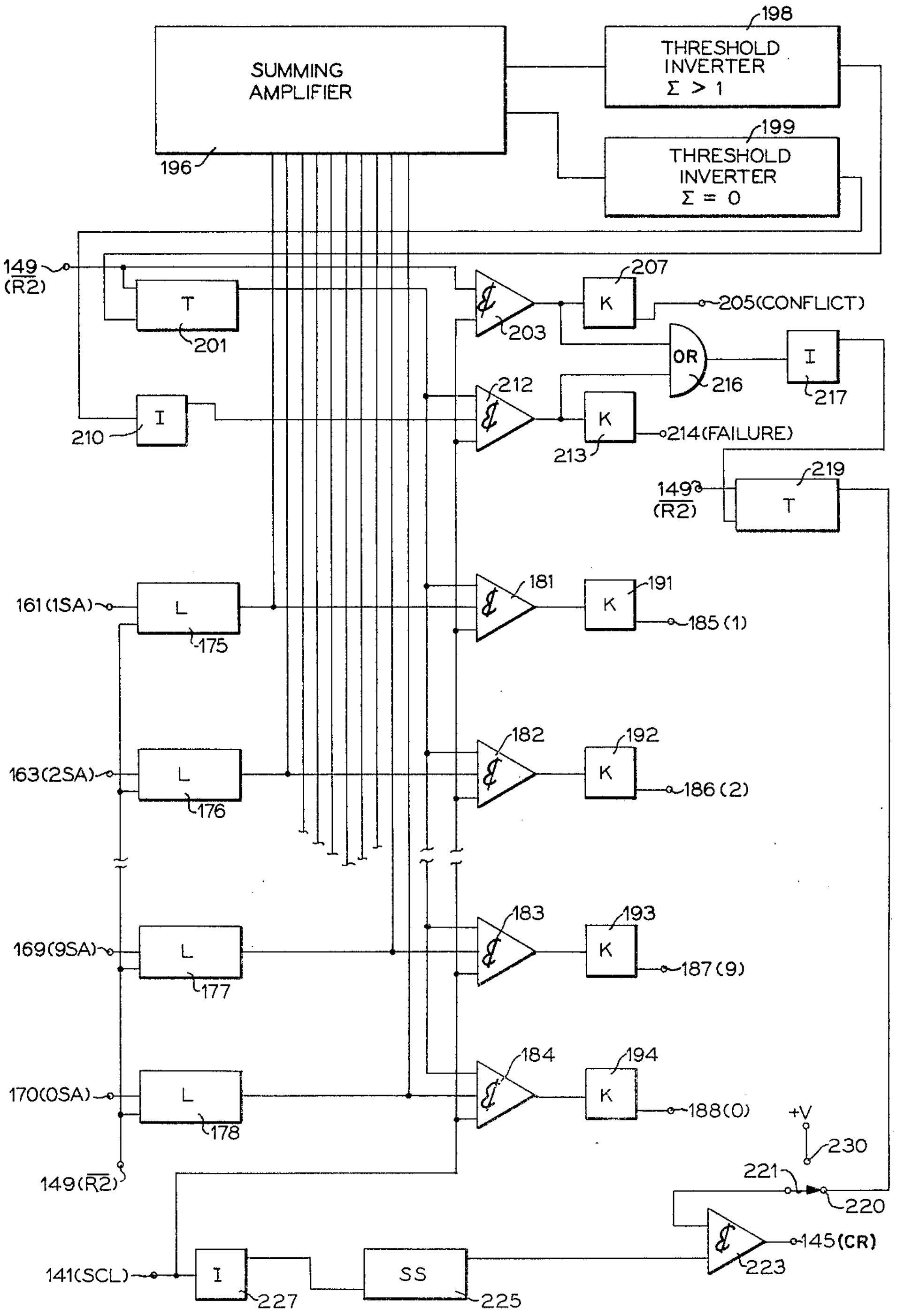

FIG. 8 is a diagrammatic illustration of one form of output checking circuits which may be employed in the system.

Figure 9:
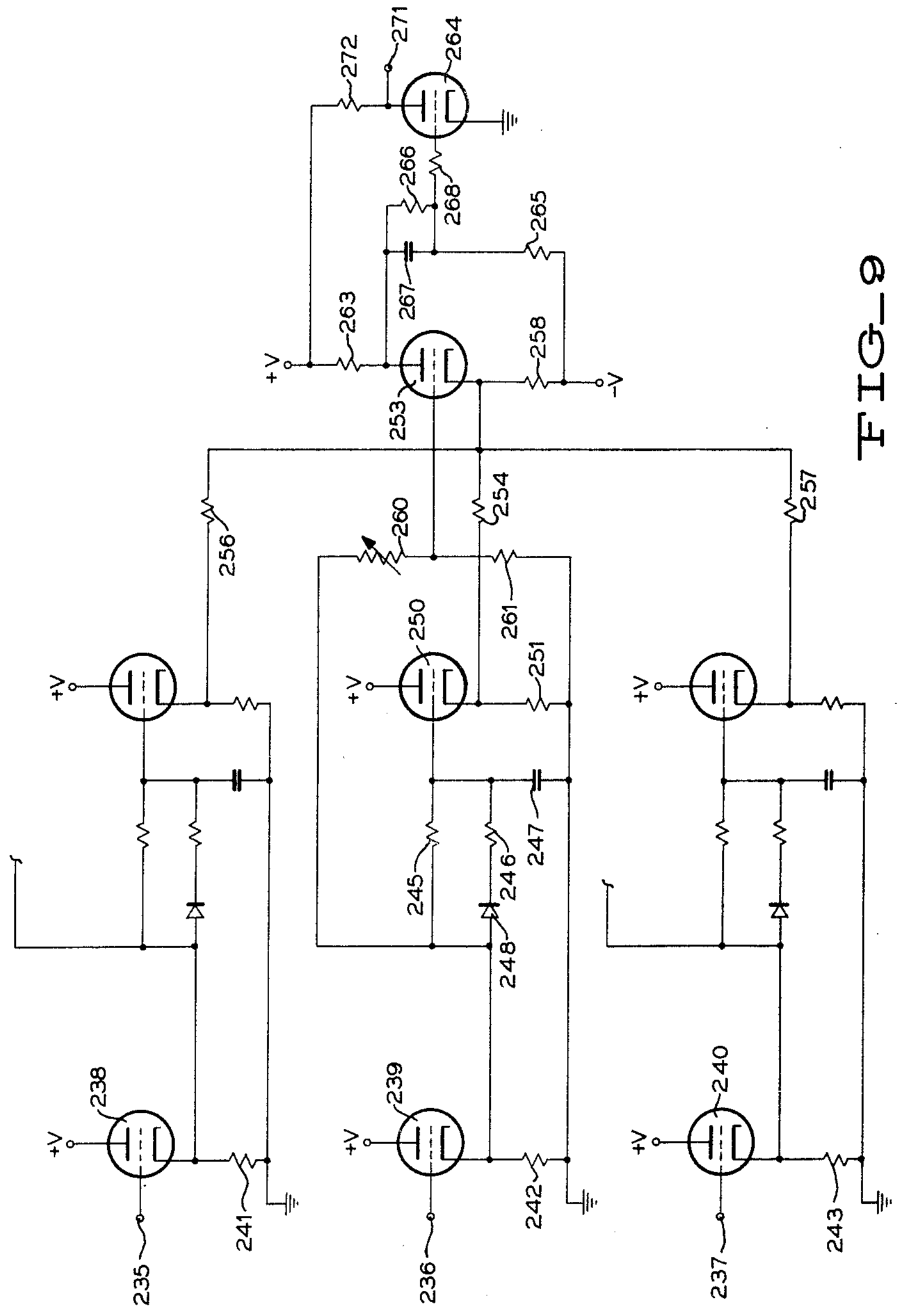
Figure 10:
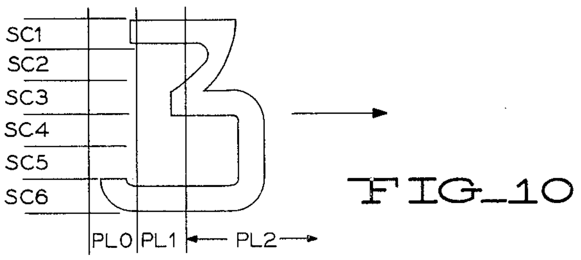

FIG. 9 is a diagrammatic illustration of one form of contrast control circuits which may be employed in the system, and FIG. 10 is a diagrammatic illustration of the manner in which edge coding of a character may be attained.

Figure 11:
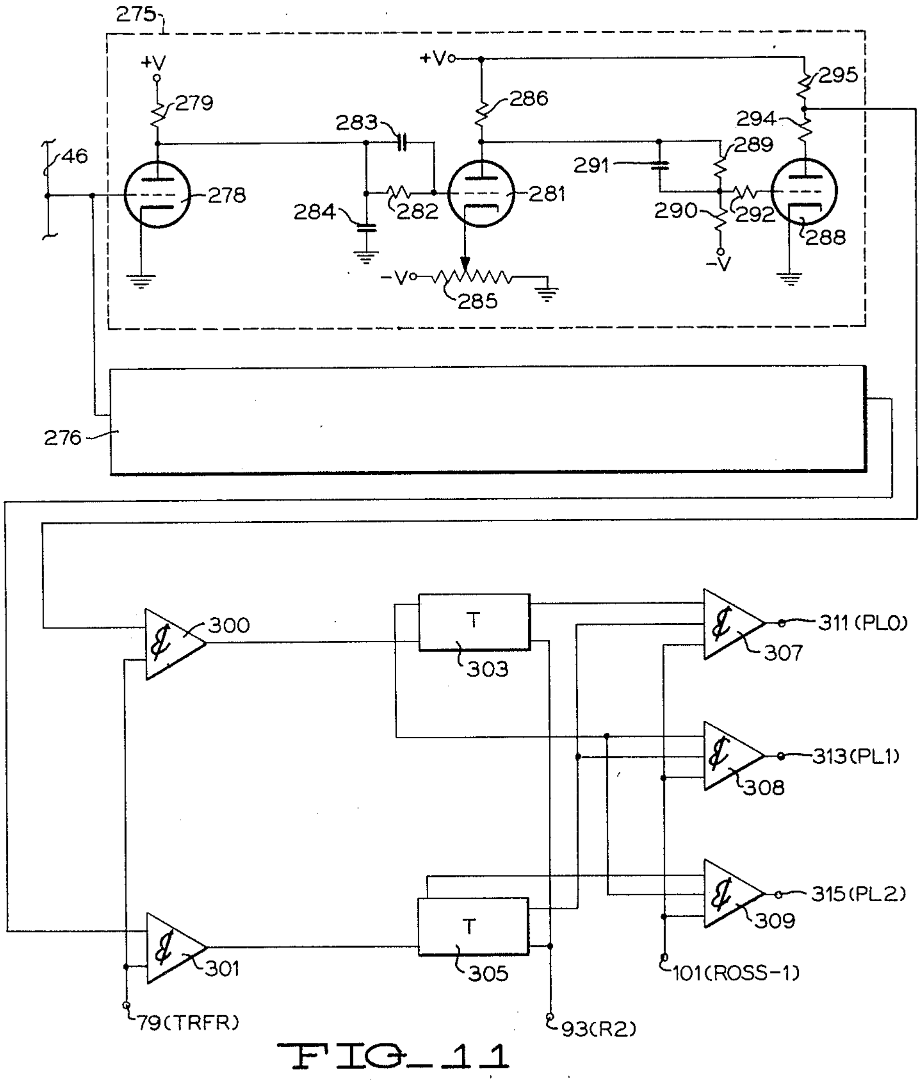

FIG. 11 is a diagrammatic illustration of one form of character edge recognition circuits which may be employed in the system.

Similar reference characters refer to similar parts in the various drawings.

With a few exceptions, the details of the various circuit elements utilized in the system are not described, since they form no part of the invention, and may take any one of a number of well known forms.

Similarly, the mechanical record feeding devices, powei supplies, and output or utilization devices which may be employed with the system are not described since they may vary and their exact form is immaterial to the invention.

*General Description*

Figure 1:
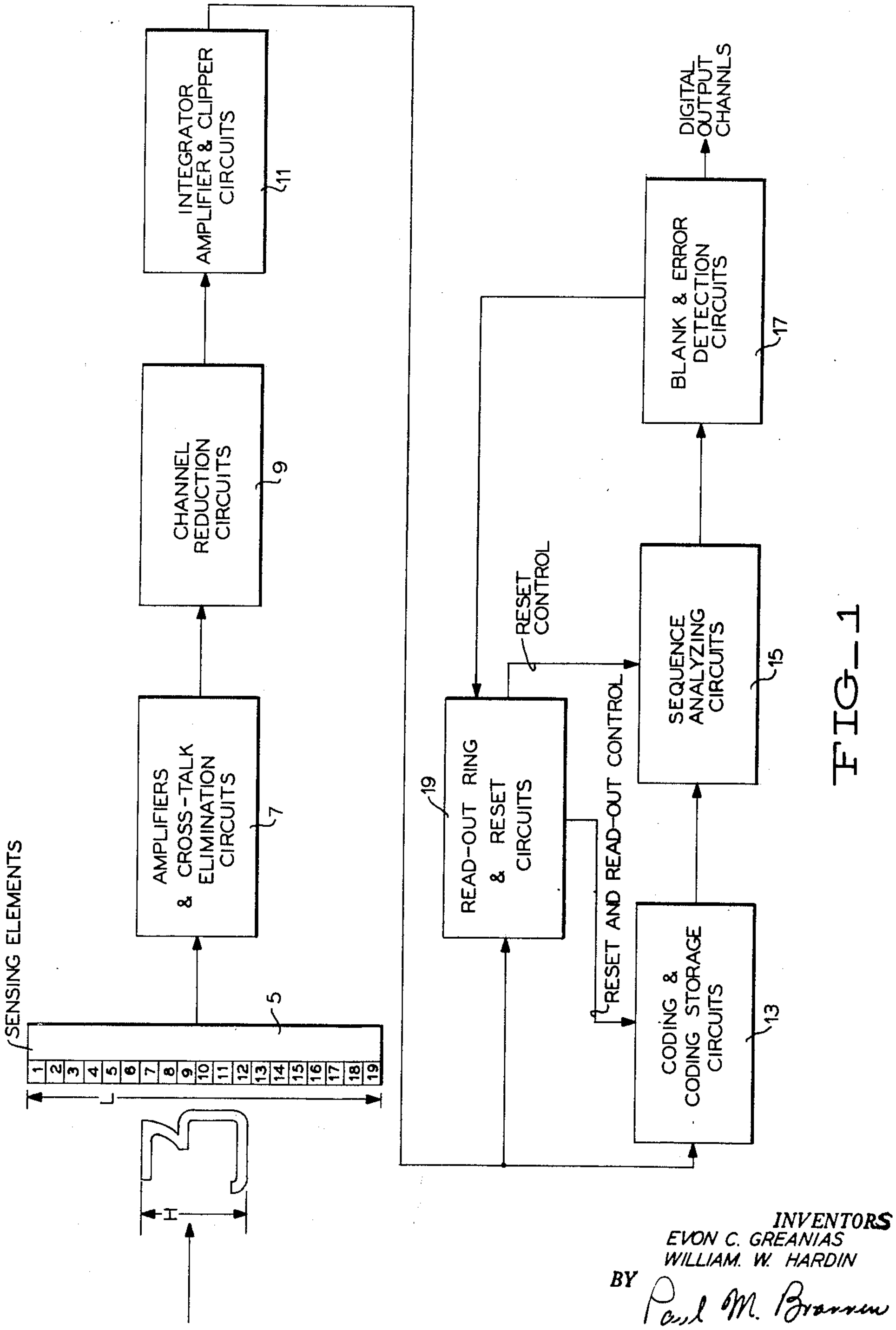
FIG. 1 is a diagrammatic illustration constituting a general block diagram or schematic diagram of a character recognition system in accordance with a preferred embodiment of the invention.

Referring to FIG. 1 of the drawings, there is shown a system block diagram illustrating the principal subsystems or functional units of a character recognition system according to a preferred embodiment of the invention. The records or documents bearing the characters to be analyzed are moved in sequence horizontally past an array of aligned sensing elements 5, by any suitable transport mechanism, not shown. Alternatively, the document or record may be held stationary and the array of sensing elements swept over the characters. Each element in the array of sensing elements is capable of selectively generating or otherwise providing a signal which is indicative of the differentiation between the character areas and the blank portions of the record or document. For example, each sensing element may be a radiation-responsive device, such as a photocell, which provides an output signal indicative of the reflective or transmittive properties of the area which it scans, so that one signal level is provided during scanning of a blank area and another signal level is provided during the scanning of a portion of a character. In the arrangements to be described in detail hereinafter, the scanning array is comprised of an aligned group of magnetic pickup devices or sensing elements, each of which provides one output signal level when scanning unmarked or blank portions of the record medium, and which provides another output signal level when scanning any portion of a magnetic character. Since either magnetized or magnetizable characters may be employed in such a system, both types of characters will hereinafter be referred to as "magnetic" characters.

The number of sensing elements in the array 5 is selected so that scanning is provided along a length L, which, in terms of discrete scanning paths, represents the sum of the maximum character height H, plus the vertical misalignment tolerance. Accordingly, it can be seen that a character which is moved relative to the scanning array will be scanned horizontally by a plurality of adjacent sensing elements, and that the particular group of adjacent sensing elements involved will depend upon the vertical alignment of the character.

Depending upon the vertical tolerance, the number of sensing elements in the total array may be several times greater than the number of elements required to span the height of a character. If the system were arranged in a manner which provided analyzing circuits for each sensing element, as has been proposed by the prior art, it is evident that a very large amount of apparatus and circuitry would be involved, to say nothing of the complexity of the analyzing circuitry caused by the fact that sequential patterns obtained by the scanning process would have to be analyzed for their appearance anywhere in the tolerance zone.

Therefore a principal feature of the invention is to provide a channel reduction system which transfers the scanning information from the primary channels, which may be considered as the individual sensing elements, to a reduced number of secondary channels, which may be considered as the input channels to the character analyzing portion of the system. Several arrangements are possible within the scope of this invention and will be described in detail hereinafter. In the over-all system diagram of FIG. 1, the outputs of the sensing elements are supplied to suitable amplifiers and cross-talk elimination circuits, indicated generally by the labeled rectangle 7, after which the information on these primary channels is passed to channel reduction circuits, indicated by the labeled rectangle 9. To form the information signal into suitable signals for use by the subsequent circuits, they are passed through suitable integrator, amplifier and clipper circuits indicated by the labeled rectangle 11.

The scanning information then enters coding and coding storage circuits, indicated by labeled rectangle 13, where it is coded and stored during the scanning operation, following which it is passed to the sequence analyzing circuits, indicated by labeled rectangle 15, where appearance of various sequences are analyzed to determine what characters have been scanned. Assuming for the sake of simplifying the drawings and description, that only numerical characters, that is, Arabic number representations, are to be recognized, ten digital output lines are provided from the sequence analyzing circuits 15, a selected one of which is energized depending upon the character which has been scanned. These output lines are connected to the input of blank and error detection circuits, indicated by the labeled rectangle 17, wherein blank positions and errors are detected, following which the digital outputs are supplied to some utilization device, not shown.

The various timing and control signals required for the operation of the apparatus are developed by the readout ring and reset circuits, indicated by the labeled rectangle 19. Signals for the control of these timing circuits are obtained from the incoming scanning data, as supplied to the coding and coding storage circuits 11, and from the blank and error correction circuits 17. Control signals from the readout ring and reset circuits 19 are supplied to the coding and coding storage circuits 13 and the sequence analyzing circuits 15, as shown.

*Detailed Description*

Having thus outlined the over-all or general arrangement of the system, the details thereof will now be described.

Figure 2:
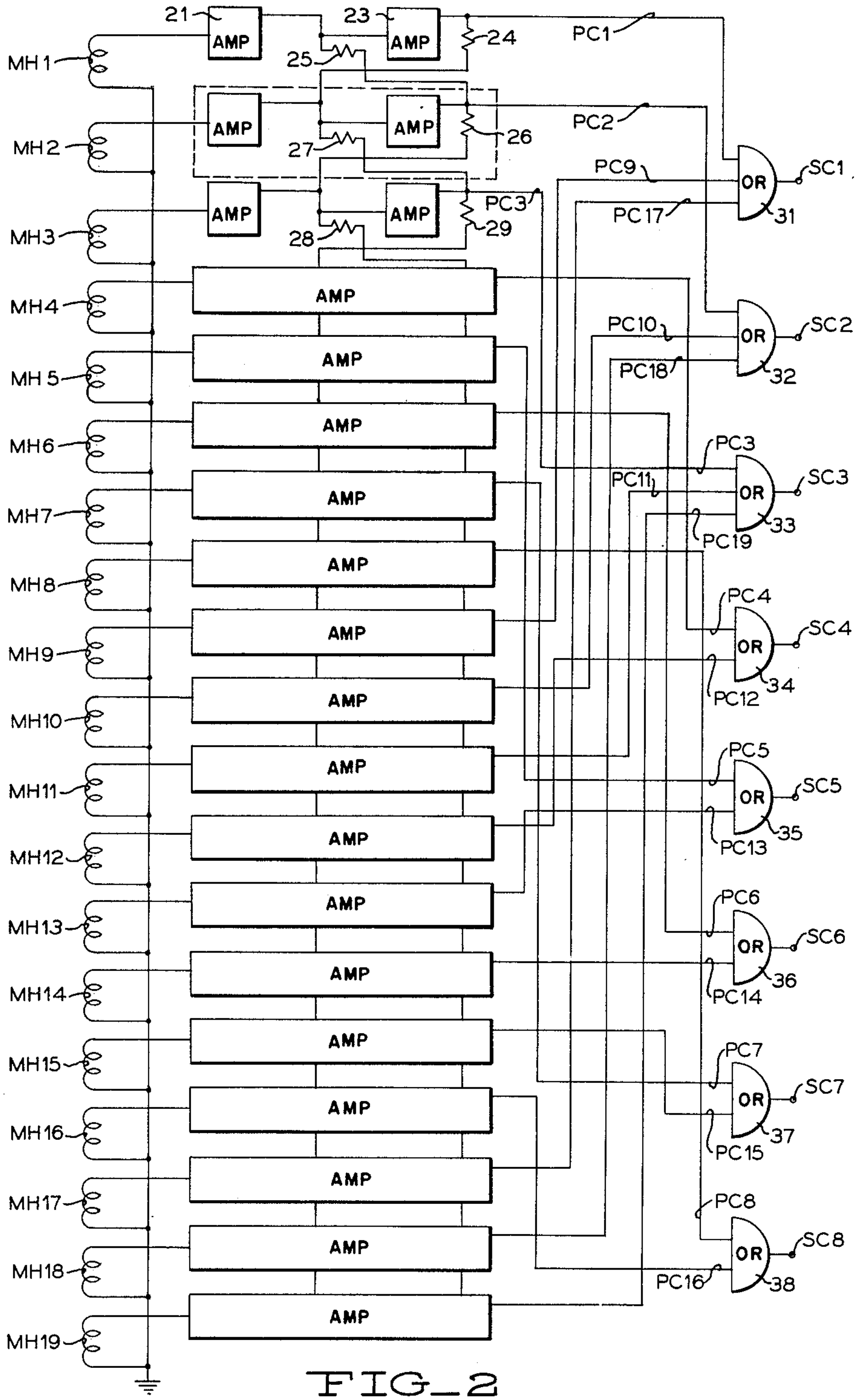
FIG. 2 is a diagrammatic illustration of one arrangement of channel reduction which may be provided in accordance with the invention.

Considering first the array of sensing elements employed for scanning, several arrangements may be utilized for this portion of the equipment. In FIG. 2, there is shown an arrangement utilizing a plurality of magnetic pickup heads, only the windings of which are shown and which are designated by the reference characters MH1 through MH19, respectively. The actual construction of the heads is not shown in detail, since it is immaterial to the present invention, and it suffices to say that each such head includes a winding, such as those shown, in which a voltage is induced by the change of magnetic flux therethrough, as provided by the relative motion of a portion of a magnetic character and the pickup head. The heads are closely arrayed in that a plurality of adjacent and contiguous channels or slices are scanned horizontally through each and every character.

Since the signals provided by each head or sensing element are relatively weak, they must be amplified to usable levels. One such arrangement of amplifiers is shown in FIG. 2. Since the amplifiers are identical for each sensing element, only the amplifiers associated with sensing elements MH1, MH2 and MH3 are shown in detail. Each amplifier includes two stages of linear amplification, of any suitable type, such as vacuum tube or transistor amplifiers, connected in cascade such as amplifier stages 21 and 23 connected to sensing element MH1. A portion of the output signal from each second stage is supplied through a suitable network indicated diagrammatically by resistors such as 24 through 27 to the inputs of the second stage for adjacent channels. Since these feedback signals are opposite in phase to the channel signals, cross-talk between adjacent channels is cancelled, so that the output from each of the channel amplifiers represents the signals picked up by the associated sensing element and does not reflect adjacent channel conditions.

Following amplification, the signals from each of the sensing elements are mixed in accordance with one embodiment of the invention to provide a reduced number of secondary channels. Each of the primary channel amplifier outputs in FIG. 2, designated by reference characters PC1 through PC19, is connected to a selected one of a plurality of mixing or "OR" circuits, designated by reference characters 31 through 38, the outputs of which form the secondary channels designated by reference characters SC1 through SC8, respectively. The number of secondary channels required is equal to the number of channels required to cover a character of maximum height, plus one additional channel for phasing purposes, as will be subsequently explained. In the embodiment disclosed, it will be considered that a character of maximum height will span seven channels, so that with the required phasing channel, eight secondary channels are employed.

The primary channels are connected to the secondary channels, through the OR circuits, in an ordered sequence, repeated as necessary. That is, primary channels PC1 through PC8 are connected to secondary channels SC1 through SC8. The sequence is then repeated for the next set of primary channels, PC9 through PC16 being connected to secondary channels SC1 through SC8, respectively. The three remaining primary channels PC17 through PC19 are again connected in the same sequence to secondary channels SC1 through SC3. Thus each secondary channel receives signals from primary channels that are spaced a distance equivalent to the number of secondary channels. In this manner, all of the scanning information derived from the sensing elements is supplied to the secondary channels despite the relative location of the character being scanned. For example, consider that the character being scanned passes under the first seven sensing elements MH1 through MH7. The scanning information on primary channels PC1 through PC7 passes to secondary channels SC1 through SC7 through mixers or OR circuits 31 through 37, respectively. Secondary channel SC8 carries no information at this time and is therefore the reference channel for subsequent phasing purposes. Considering another example, let the character information be supplied over primary channels PC13 through PC19, conforming to the scanning of character information by sensing element MH13 through MH19. In this instance, the information on primary channels PC13 through PC16 will be supplied to secondary channels SC5 through SC8; the information on primary channels PC17 through PC19 will be supplied to secondary channels SC1 through SC3; and secondary channel SC4 will carry no information.

As will later be described in detail, the scanning information on secondary channels SC1 through SC8 is stored during scanning, and the storage devices are then scanned in succession to determine which channel carries no information and the order of appearance of information, if any, on the secondary channels. The blank secondary channel, used for phasing purposes, may be arbitrarily designated to indicate a suitable reference point, such as the top or the bottom of the character being scanned, in order to provide a reference for determining the completion of a sequence in which information is to be analyzed.

Figure 3:
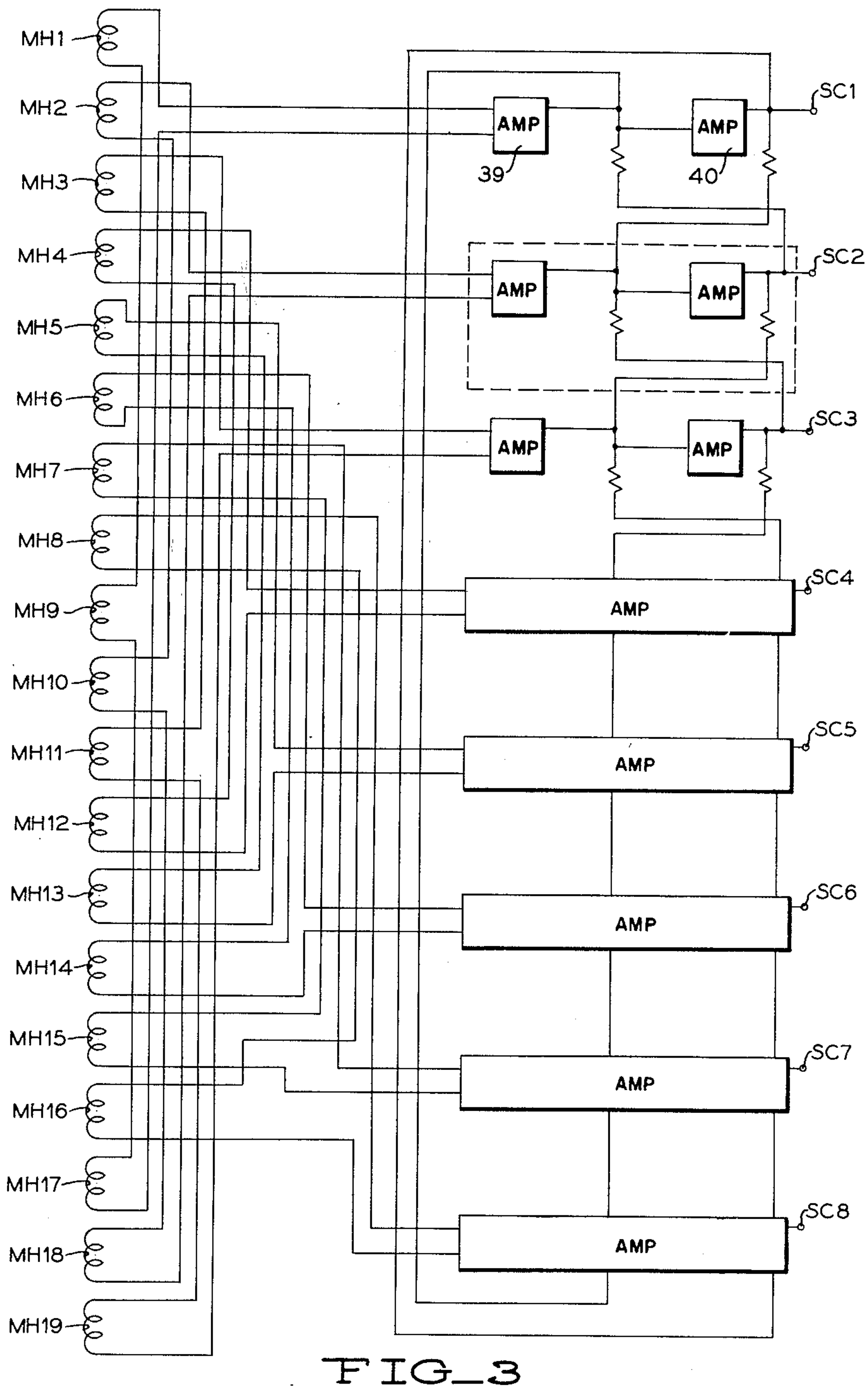
FIG. 3 is a diagrammatic illustration of another arrangement of channel reduction which may be provided in accordance with the invention.

A modification of the sensing element arrangement, amplifiers, and channel reduction circuits which may be employed is illustrated in FIG. 3. In this arrangement, the windings of the sensing elements which are to supply signals to a particular secondary channel are connected in series and thence to the input of a linear amplifier, the output of which is connected to the associated secondary channel. Thus windings MH1, MH9 and MH17 are connected in series across the input of the linear amplifier including stages 39 and 40 connected in cascade, the output of stage 40 being connected to secondary channel SC1. Windings MH2, MH10 and MH18 are connected in series across the input to a second linear amplifier which has its output connected to secondary channel SC2. Each of the sensing windings is connected in a suitable series arrangement to linear amplifiers associated with the remaining secondary channels in a manner obvious from the drawing and the previous examples. This arrangement requires less apparatus than the arrangement of FIG. 2, in that the mixers are eliminated, and the number of amplifiers is reduced, but it requires that signals of sufficient magnitude be generated in the windings of the sensing elements and/or that these windings have a relatively low impedance, in view of the series connections.

It should be noted that the feedback circuits employed for cross-talk elimination in FIG. 3 are similar to those shown in FIG. 2, except that feedback must be provided between the amplifiers connected to secondary channels SC1 and SC8, in view of the channel reduction taking place ahead of the amplifiers and hence adjacent windings may be connected to these two amplifiers, as, for example, windings MH8 and MH9.

From the foregoing, it is apparent that an important feature of the invention resides in the provision of channel reduction whereby a plurality of primary channels are connected in repeated ordered sequences to a reduced number of secondary channels, whereby information supplied over a group of primary channels equal to the number of secondary channels appears on the secondary channels in a predetermined order.

Figure 4:
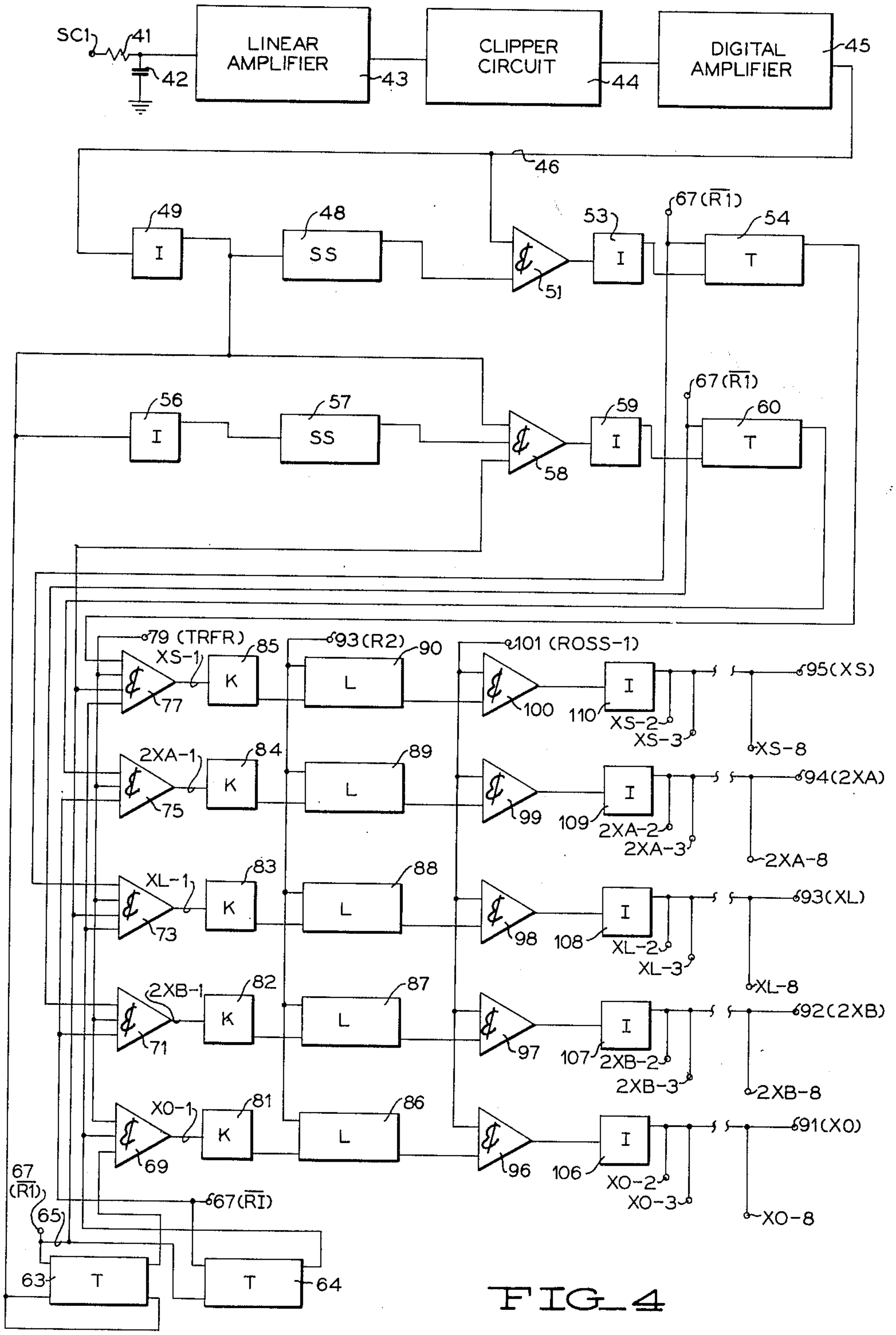
FIG. 4 is a diagrammatic illustration of one form of encoding circuits and intermediate storage means which may be employed.

The secondary channels SC1 through SC8 are each connected to circuit arrangements for shaping the pulses to usable digitalized pulses which serve as inputs to the analyzing portion of the system. The pulse shaping circuits and coding circuits for channel SC1 are shown in FIG. 4, and it is to be understood that such a circuit arrangement is provided for each of the other seven secondary channels SC2 through SC8, but these additional circuits are not repeated in the drawings for the sake of simplifying the disclosure. The signals on channel SC1 are integrated by a conventional RC integrator comprising resistor 41 and capacitor 42 and are then amplified by linear amplifier 43, clipped by clipper circuit 44, and the resulting pulses are amplified by digital amplifier 45. The exact structure of these circuits may differ and is immaterial to this invention, hence they are not shown in detail. It will be assumed that a positive-going pulse is provided at the output 46 of amplifier 45 each time that a portion of a character is sensed by the associated sensing elements in the primary channels, and that the duration of the pulse is proportional to the width of the scanned portion of the character.

A first single shot or monostable unit 48 is supplied with pulses from line 46 through an inverter 49. The parameters of the single shot are selected so that each inverted pulse supplied thereto initiates a negative pulse of predetermined length which is supplied from the output of single shot 48 to one input of an AND circuit 51, the other input of AND circuit 51 being connected to line 46. Since an output will be provided from AND circuit 51 when and only when both inputs are positive, it can be seen that the function of this portion of the system is to provide an output pulse when the scanned or black portion of the character produces a pulse longer than a predetermined interval, this interval being the operating period of the single shot unit. The output of AND circuit 51 is inverted by an inverter 53 and supplied to the input of a trigger 54 for storage and subsequent use.

The output from inverter 49 is also supplied to an inverter 56 and thence to a single shot 57, the output of which is supplied to one input of AND circuit 58, with a second input of AND circuit 58 being connected to the output of inverter 49. This circuit operates in a manner similar to that previously described for single shot 48, to detect the existence of "white" gaps longer than a predetermined size, the output of AND circuit 58 being inverted by inverter 59 and governing the setting of a trigger 60. Since the length of white gaps is of interest only after a black area has been detected, a third input to AND circuit 58 is provided which is governed by the crossover counter to be subsequently described. Accordingly, the output from the white gap circuit is passed to its storage trigger 60 only after a single crossover or black area is detected, and any white areas following a second crossover is ignored.

The crossover counter comprises two conventional triggers 63 and 64 connected in cascade. The triggers are arranged so that the left-hand side is normally conducting, so that the output lines at the top left-hand side and top right-hand side are normally down and up, respectively. A "down" condition is considered to be one of relatively low voltage output, and conversely an "up" condition is considered to be one of relatively high voltage output. A negative-going pulse supplied to the inputs, at the lower left-hand side and lower right-hand side, (where used), causes the trigger to reverse its state and therefore the outputs are changed so that the left-hand side goes up and the right-hand side goes down. Henceforth in the specification, a trigger shall be termed to be "off" when the left-hand side is conducting, and "on" when the right-hand side is conducting.

As shown in FIG. 4, both inputs of trigger 63 are connected to the output of inverter 49, so that the trigger 63 receives a negative pulse each time the leading edge of a black area occurs. Since both inputs receive signals from the same source, trigger 63 is switched to its alternate states by alternate inputs, in conventional binary fashion, so that it is turned on at the beginning of the first black area, turned off at the beginning of the second black area and so on. The output of trigger 63 which rises when the trigger turns on is connected to a line 65 which supplied a control signal to the left-hand input of trigger 64. Since the triggers are responsive only to negative-going pulses, it can be seen that trigger 64 will turn on at the leading edge of the pulse produced by a second crossover of a black area. Both triggers are turned off, their normal condition, by a resetting pulse $\overline{R1}$ supplied at a terminal 67 from a circuit to be subsequently described. The triggers are reset by the well-known expedient of "plate pull-down" in which a negative-going pulse supplied to the output lines on the on or left-hand side of the trigger reduces the voltage and consequently causes the trigger to revert to their normal or off condition. Since the resetting pulse, $\overline{R1}$, is employed at many locations in the circuits, the terminal 67 denotes a common or bus connection for this signal, throughout the drawings. The necessary disjunctive connections to prevent reactions of the various circuits connected to the common reset terminals are not shown for the sake of clarity.

Having thus provided for counting the number of crossovers seen during the scanning of any primary channel associated with secondary channel SC1, and having provided for the detection of "black" and "white" areas of at least predetermined widths, these conditions may be combined by suitable logic circuits for transfer to an intermediate storage, pending a sequential analysis of the data. Five conditions or recognition criteria are to be considered, each of which provides a suitable output pulse which is employed to condition a storage device, such as an electronic latch circuit. These conditions or criteria, will now be described, followed by a description of the circuitry included in determining them. The first condition is that where no black areas are detected during scanning, designated by the reference character X0; the second and third conditions are those obtained when a single crossover, of a short black area or a long black area respectively, are detected during scanning, and which are designated by the reference characters XS and XL, respectively. The fourth and fifth conditions are those obtained for two or more crossovers, and are differentiated with respect to a short white area or a long white area between the first crossover and the second crossover. These latter two conditions are designated by the reference characters 2XA and 2XB, respectively.

Such conditions must be determined for each of the eight secondary channels, stored temporarily, and then examined to determine whether or not certain sequences of such conditions are obtained in the stored information denoting the scanning of a particular character. The manner in which these conditions are determined is shown in FIG. 4 for secondary channel SC1, and it is to be understood that similar arrangements are provided for each of the other secondary channels SC2 through SC8. To distinguish the criteria obtained from a particular channel, the condition will be followed by a suffix corresponding to the secondary channel designation, such as X0–1, for example, since corresponding conditions are then supplied to a common set of buses for sequence analysis.

Referring to FIG. 4, a plurality of AND circuits 69, 71, 73, 75 and 77 are provided with an input from a transfer signal terminal 79 (TRFR) so that when a suitable signal is provided on this terminal, any one of the AND circuits which has all of its remaining inputs energized will supply a signal from its output. Considering AND circuit 69, the other inputs thereto are supplied from triggers 63 and 64, both in their off condition, indicating that no crossovers have occurred. Accordingly, an output from AND circuit 69 corresponds to the condition X0–1. AND circuit 71 is governed by trigger 64 in its on condition and by the white gap trigger 60 in its on condition, thereby indicating at least two crossovers with a long white area between the first and second crossovers, corresponding to the condition 2XB–1. AND circuit 73 requires that, for an output signal to be supplied therefrom, the crossover counter trigger 63 be in its on condition, black area trigger 54 be in its on condition, and the crossover counter trigger 64 be in its off condition, these requirements corresponding to condition XL–1. AND circuit 75 provides an output therefrom when crossover counter trigger 64 is on, and white gap trigger 60 is off, thereby indicating the condition 2XA–1. AND circuit 77 provides an output therefrom when crossover counter trigger 63 is on, crossover counter trigger 64 is off, and black area trigger 54 is off, corresponding to the condition XS–1.

The outputs from AND circuits 69, 71, 73, 75 and 77 are supplied through cathode followers 81 through 85, respectively, to the inputs of a corresponding set of intermediate storage devices, such as the electronic latches 86 through 90, respectively. The details of these latches are not shown, since the actual structure forms no part of this invention, and may take any of several well-known forms, an example of which is shown and described in U.S. Patent No. 2,628,309, granted on February 10, 1953, to Ernest S. Hughes, Jr., for Electronic Storage Device. Suffice it to say that an input pulse supplied to the lower left-hand side of the latch, as diagrammatically shown, turns the latch on to thereby cause a persisting signal to be supplied from the output at lower right, even though the input or turn on pulse has terminated, which output signal is terminated by supplying a turn-off or reset signal momentarily to the upper left-hand side of the latch. As shown, the reset signal to latches 86 through 90 is supplied from a signal terminal 93 (R2), which is supplied at times with a pulse designated as R2, the generation of which will be subsequently described.

It is apparent that the criteria for each of the secondary channels, encoded as the crossover count and long and short black and white areas, is thus stored in the intermediate storage provided for each channel, in this instance the electronic latches, for subsequent retrieval for sequence analysis.

The recognition criteria stored for each of the eight secondary channels is sequentially read out of the intermediate storage means associated with each channel to a set or common criteria buses designated by the reference characters 91 through 95, also indicated by the symbolic designations X0, 2XB, XL, 2XA and XS, respectively. An output AND circuit or switch is provided for each of the five latches assigned to a channel, such as AND circuits 96, 97, 98, 99 and 100, having one input connected to the output of latches 86, 87, 88, 89 and 90, respectively. The other input of each of these AND circuits is connected to a common terminal 101 (ROSS–1) to which at times is supplied a pulse designated as ROSS–1. This pulse is one of a sequence of eight pulses supplied by means to be described later, and these pulses control the sequential read out, from intermediate storage of the recognition conditions existing for each of the secondary channels at the end of the character scanning.

Accordingly, at readout time for the secondary channel in question, the AND circuits 96 through 100 are enabled, and supply an output pulse for whichever storage latch is on or set, to the common criteria buses 91 through 95, by way of inverters 106 through 110.

Figure 5:
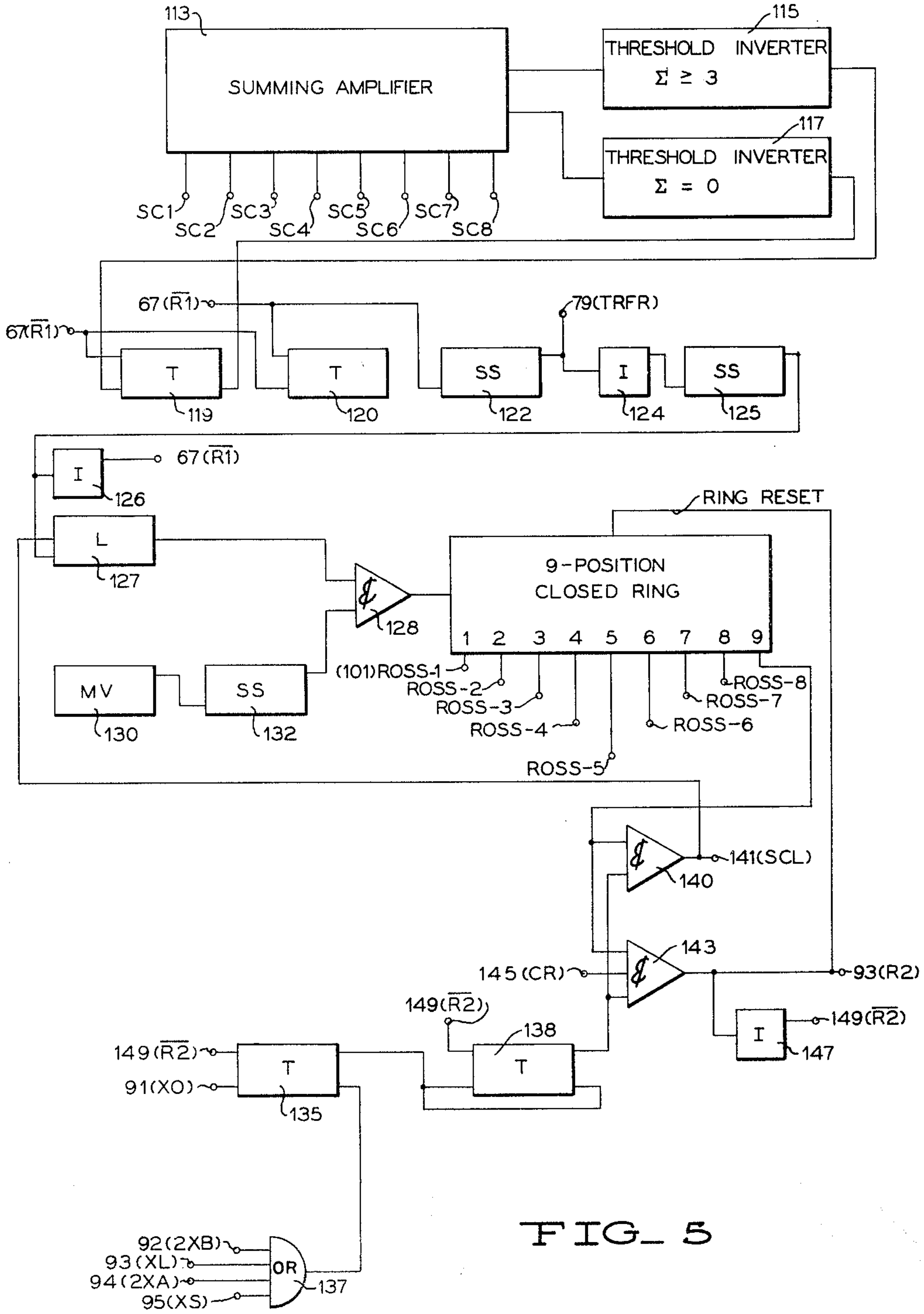
FIG. 5 is a diagrammatic illustration of one form of readout ring circuits which may be employed in the system.

Referring now to FIG. 5, there is shown the apparatus which provides certain of the timing and control signals for the operation of the system. The outputs of the eight secondary channels SC1 through SC8 are supplied to a summing amplifier 113 of the type well known in analog computer art, the output of which is proportional to the number of inputs supplied simultaneously to the amplifier. A first and a second threshold inverter 115 and 117 are connected to the output of the summing amplifier 113, and the parts are proportioned and arranged so that threshold inverter 115 provides an output signal when and only when three or more of the channels provide signals for a minimum period, thus providing a "minimum character" indication, and so that threshold inverter 117 provides an output signal when and only when all eight of the channels are down for a minimum period, thereby providing a "no character" indication. The threshold inverter signals are supplied to opposite inputs of a trigger 119, so that the trigger 119 is turned on by a signal from threshold inverter 115 and is turned off by a signal from the threshold inverter 117. A second trigger 120 is governed by trigger 119 so that trigger 120 is turned on as a result of trigger 119 being turned off, and both triggers are reset by the "pull-down" reset pulse $\overline{R1}$, supplied from terminal 67. The output of trigger 120 is supplied to the input of a single shot or monostable multivibrator 122, which is arranged to provide an output pulse of predetermined length each time that it is triggered by an output signal from trigger 120. This output pulse, supplied to terminal 79 (TRFR) controls the transfer of the recognition criteria or conditions to the intermediate storage for each channel, as previously explained. It can be seen from the drawings that terminal 79 is supplied with a single pulse (TRFR) each time the "no character" condition follows a "minimum character" condition so that this signal is, in effect, an "end of character" signal. This signal is also supplied through an inverter 124 to a single shot 125, proportioned and arranged to provide a suitably timed output to an inverter 126, the output of which is supplied to terminal 67 and which is designated as $\overline{R1}$. This pulse is the reset pulse which resets triggers 54, 60, 63 and 64 of FIG. 4, the scanning condition triggers previously described, as well as triggers 119 and 120. Accordingly, when the end of a character is reached, the scanning condition information is transferred to intermediate storage, in this case the five latch circuits associated with each secondary channel, following which the crossover counter triggers and the black and white area triggers for each secondary channel are reset preparatory to scanning the next character.

At the end of transfer time, i.e., at character scanning reset time, the single shot 125 also supplies a signal to the input or set circuit of a latch 127, the output of which is supplied to one input of an AND circuit 128. The other input of AND circuit 128 is supplied with pulses generated by a free-running multivibrator 130 and shaped by a single shot 132. The output of AND circuit 128 is supplied to the input of a nine position closed ring, of conventional design. The frequency of the multivibrator need only be slightly greater than eighteen times the minimum rate at which characters are to be scanned, since the operation of the system requires two complete counting cycles of the nine position ring. In the particular arrangement disclosed, a nine position ring is employed, but the number of positions will vary in accordance with the number of secondary channels provided, there being one ring position for each secondary channel, plus one additional ring position for control purposes. The ring is normally in a reset or initial state with no outputs on the output lines, which are connected respectively to terminals ROSS–1 through ROSS–8. These terminals supply readout pulses to the intermediate storage, as previously described for AND circuits 96 through 100 in FIG. 4, where the pulse supplied to terminal 101 (ROSS–1) governs readout from latches 86 through 90. The last, or ninth position supplies a control pulse to circuit which will be subsequently disclosed.

It is apparent therefore that following transfer time, the ring provides readout control for sequentially reading out the stored information from each of the secondary channels to the common criteria buses 91 through 95, in order starting with the first secondary channel SC1 and progressing through the last secondary channel SC8.

From the arrangement described, it is seen that the bottom of a character will be indicated by the condition X0, following a sequence of X0, $\overline{X0}$, on the common condition buses 91 through 95. A trigger 135 is turned on by the trailing edge of an X0 pulse appearing at terminal 91, the common bus for this condition. This trigger is turned off by the trailing edge of $\overline{X0}$ pulse, obtained by mixing the pulses from the remaining buses 92 through 95 in an OR circuit 137. This arrangement provides a positive check that a signal is present on one or more of the lines other than X0.

The output of the right side of trigger 135 is supplied to both inputs of a trigger 138. Since these triggers are of the type that are switched to opposite states by negative-going transients, it follows that trigger 138 will be turned on by trigger 135 being turned on, that is, from a signal X0. Trigger 135 is turned off by $\overline{X0}$, but since this is represented by a positive-going signal to trigger 138, this trigger remains on. When trigger 135 is again turned on by the trailing edge of the second X0 pulse, trigger 138 is turned off, so that its right-hand output returns to its up level. This signal is combined with the output of position 9 of the 9-position ring in AND circuit 140. The output of this AND circuit is supplied to a common terminal 141 (SCL) and is designated SCL, Sample Character Latch. This signal is supplied to the character latches, to be subsequently described, and additionally is employed to reset latch 127, which governs the supply of stepping pulses to the ring. Another AND circuit 143 has the same inputs as AND circuit 140, and additionally receives a signal from terminal 145 (CR), designated as CR, or Character Recognition, which signal is generated, as later described, when the character recognition process is completed. The output of AND circuit 143 is supplied to terminal 93, and is designated as the R2 signal, previously described in connection with the intermediate storage latches shown in FIG. 4. This signal is also supplied through an inverter 147 to terminal 149, as the signal $\overline{R2}$, which is employed among other uses to reset triggers 135 and 138. The reset circuit of the 9-position ring is connected to terminal 93, so that the ring is reset by pulse R2.

The recognition criteria sequentially read out of intermediate storage on the common criteria or condition buses, are supplied to a plurality of sequence analysis circuits, one for each character which is to be recognized. Each of these sequence analysis circuits comprises a group of bistable units which may comprise conventional triggers arranged in cascade and connected to each other and to the common condition buses in such a manner that when and only when a predetermined sequence of signals appears on the common condition buses, an output signal is provided from the last unit in the group. Each character to be recognized may be previously analyzed for the sequences which uniquely define that character, and the appropriate sequence can then be determined by properly arranging the bistable units.

A typical set of sequences which may be utilized for recognizing an exemplary font of numerical type, from 1 through 0, is shown in FIGS. 6*a* and 6*b*. Each of the numerals shown is identified by the sequence shown thereunder. For example, the numeral 3 is identified by the following sequence reading from top to bottom of the numeral: no black (X0), one crossover with long black (XL), corresponding to the long horizontal top portion of the numeral 3; a short white area between two crossovers (2XA), corresponding to the white area within the upper loop of the numeral 3; one crossover with long black (XL) corresponding to the central portion of the numeral 3; one crossover with short black (XS) corresponding to the upper portion of the lower loop of the numeral 3; two crossovers with a long white therebetween (2XB) corresponding to the large included white area of the lower loop of the numeral 3; one crossover with long black (XL) corresponding to the long horizontal portion of the bottom loop; and ending with no black (X0).

Each of the remaining characters may be similarly analyzed to provide the sequences shown for them. It now remains to provide suitable means for detecting when one of the sequences occurs. One such arrangement is shown in FIG. 7, where ten sequence analysis circuits are shown, one for each of the ten numerals 1 through 0 which are to be identified. Each circuit comprises seven triggers connected in cascade, with the inputs to the triggers arranged so that when and only when eight sequential signals appear in a predetermined order on the common condition buses will there be an output from one of the sequence analysis circuits. The operation of the sequence analysis circuits are similar for each numeral, and it is accordingly believed that the following discussion of the operation of one of the circuits will enable one skilled in the art to comprehend the operation of all of the sequence circuits.

Referring to FIG. 7, the seven triggers of the third row provide an output to a terminal 151 (3SA) when and only when the following sequence of signals occurs on the common condition buses 91 through 95; X0–XL–2XA–XL–XS–2XB–XL–X0. The first signal on the X0 bus is supplied to an input of a trigger 153 to turn the trigger on; the next signal, on the XL bus, is supplied to the other input of trigger 153 to turn the trigger off, such action turning the next trigger 154 on; the next signal, on the 2XA bus, is supplied to trigger 154 to turn this trigger off and thus to turn the next trigger 155 on; the next signal, on the XL bus, turns trigger 155 off and thus turns trigger 156 on; the next signal, on the XS bus, turns trigger 156 off and thus turns trigger 157 on; the next signal, on the 2XB bus, turns trigger 157 off and thus turns trigger 158 on; the next signal, on the XL bus, turns trigger 158 off and thus turns trigger 159 on; the last signal, on the X0 bus, turns trigger 159 off and provides an output signal at terminal 151 (3SA), indicating that a numeral 3 has been recognized.

Examination of the other 9 sequence circuits in relation to the sequences given for each of the numerals in FIGS. 6*a* and 6*b* will show that these circuits will provide outputs at the terminals 161 (1SA), 163 (2SA), 164 (4SA), 165 (5SA), 166 (6SA), 167 (7SA), 168 (8SA), 169 (9SA) and 170 (0SA) when the characters 1, 2, 4, 5, 6, 7, 8, 9 and 0, respectively, are recognized by the system.

Each and every trigger in the sequence analysis circuit is reset by a pulse supplied thereto from terminal 149 ($\overline{R2}$) at reset time, but the reset terminal connections are so designated only in the third sequence circuit and the reference character designations have been omitted from the remaining triggers in order to clarify the drawings.

Since as previously pointed out, the number of secondary channels is greater by one than the number of channels required to carry sensing data for a character of maximum height, it is apparent that each sequence will include an X0 code at the top and bottom of the character. The phase of the characters can accordingly be identified by the use of an X0 signal to denote the top and/or the bottom of a character.

When a sequence has been satisfied, a signal is provided at one of the terminals of the sequence analysis circuits indicative of the character recognized and this information is stored in a latch circuit, one of which is provided for each sequence analysis circuit. Referring to FIG. 8, four of ten character latches are shown, designated by reference characters 175 through 178, the inputs of which are connected to terminals 161 (1SA), 163 (2SA), 169 (9SA) and 170 (0SA), respectively, and which, therefore, store the recognition of the numerals 1, 2, 9 and 0. These latches are reset by the connection of terminal 149 ($\overline{R2}$).

When the bottom of a character is reached in the scanning operation as determined by the detection of the condition X0 followed by $\overline{X0}$ followed by X0, by the triggers 135 and 138 and their associated circuits shown in FIG. 5, the SCL pulse appearing at this time on terminal 141 is supplied to one of three inputs of each of a plurality of output AND circuits, such as those designated by reference characters 181, 182, 183 and 184 in FIG. 8. These AND circuits, one of which is provided for each character latch, serve as output sampling devices to govern the output of character recognition signals to any suitable utilization device, such as a card punch, a calculator or any type of audio or visual output device. The four AND circuits shown in FIG. 8 govern the outputs supplied to terminals 185 (1), 186 (2), 187 (9) and 188 (0) through cathode followers 191, 192, 193 and 194, respectively, thus controlling the output signals for numerals 1, 2, 9 and 0. It will be understood that similar arrangements of latches and AND circuits will be provided for the remaining numerals, but these are not shown for the sake of simplifying the drawings.

Before an output signal is provided, assurance must be had that one and only one character has recognized. To check this condition the output circuit of each of the character latches is connected to an associated input circuit of a conventional summing amplifier 196, as shown for latches 175 through 178. The output of the summing amplifier is connected to the inputs of two threshold inverter circuits 198 and 199, the first of which provides an output when and only when more than one input to the summing amplifier is energized, that is, when more than one character latch is on. The second threshold inverter 199 provides an output when and only when none of the summing amplifier inputs are energized, that is, when none of the character latches have a character recognition signal stored therein. The output of threshold inverter 198 is connected to the input of a trigger 201, which in turn has its off output connected to one of the three inputs of the character output AND circuits. Thus if one and one only of the character latches in on, the associated AND circuit will have all three inputs energized by the SCL pulse supplied at terminal 141, to thereby energize the appropriate output terminal.

If more than one character latch is on, the output from threshold inverter 198 will turn trigger 201 on, thereby cutting off the output to the character latch output AND circuits, so that no signal is supplied to the output terminals at this time. Additionally, the on output of trigger 201 is supplied to an AND circuit 203, along with the SCL pulse, so that a CONFLICT signal is supplied to terminal 205 through a cathode follower 207. This signal may be employed for any suitable purpose, such as actuating an alarm, stopping the machine operation, or initiating a rescanning cycle.

Similarly, if none of the character latches contain information, the threshold inverter 199 supplies a signal through an inverter 210 to one input of an AND circuit 212, the other two inputs being supplied from the off side of trigger 201 and terminal 141. The output of AND circuit 212 is supplied through a cathode follower 213 to a terminal 214, to thereby provide a FAILURE signal when and only when no character has been sensed. This signal may be employed in the same manner as the CONFLICT signal. The outputs from AND circuits 203 and 212 are mixed in an OR circuit 216, and supplied through an inverter 217 to the input of a trigger 219, which is reset by the $\overline{R2}$ pulse from terminal 149. Thus, the occurrence of either a CONFLICT or a FAILURE signal will set trigger 219 on and thus inhibit the supply of a signal therefrom to one contact 220 of a switch 221. With the switch in the position shown, the normally off output (high) of trigger 219 is supplied to one input of an AND circuit 223, the other input of which is connected to the output of a single shot 225, which in turn has its input connected through an inverter 227 to terminal 141. Thus, following the character latch readout pulse SCL, a delayed pulse is supplied via single shot 225 to AND circuit 223, and if neither a CONFLICT or a FAILURE condition exists, an output is supplied to terminal 145 (CR). Referring now to FIG. 5 of the drawings, AND circuit 143 has one of its inputs connected to terminal 145 (CR), so that at the end of scanning and readout, a pulse (R2) is supplied from the output of AND circuit 143, as well as the general resetting pulse $\overline{R2}$, which is obtained via inverter 147 and supplied to terminal 149 ($\overline{R2}$). This resetting pulse is supplied to most of the various triggers and latches as indicated on the drawings, and when supplied restores all these devices to their normal condition preparatory to another cycle of operation.

In the event that a FAILURE or CONFLICT signal is obtained, the system may be reset by operating switch 221 to its other position, where contact 230 is connected to a source of positive potential, thereby enabling the AND gate 223.

From the foregoing description, it can be seen that this invention provides a novel and simplified method of character analysis, wherein the characters are scanned in a plurality of horizontal scans or slices, utilizing a sufficiently large number of primary or scanning channels to include the maximum height of a character to be analyzed, plus the maximum vertical tolerance. The information in the primary channels is supplied to a reduced number of secondary channels, equal in number to the number required to span a character of maximum height, plus one additional channel for phasing purposes. This information is coded for each channel in terms of the number of times portions of the character (crossovers) are sensed, the length of these portions and the lengths of the intervening background, and the recognition criteria thus derived is stored a plurality of storage devices associated with each channel. These stored conditions or criteria are then read out sequentially to a group of sequence analysis circuits, one for each character to be recognized, which circuits are arranged to provide an output when and only when a given sequence of conditions are presented thereto, representing the characters associated with the particular sequence analysis circuit. Since each scanning of the storage devices will include one channel containing no information, the absence of signals from a particular channel may be used to determine the phase of the sequence analysis operation. Additionally, circuits are provided to detect absence of or surplusage of character recognition information.

Referring now to FIG. 9 of the drawings, there is shown a modification of the circuit arrangement of FIG. 2, in which an automatic clipping control is provided for the parallel primary scanning channels. When such a system is used, the cross-talk elimination circuits shown in FIGS. 2 and 3 may be eliminated. Only three of the channels are shown, but it will be obvious from this drawing and description that all of the primary channels are arranged in similar fashion. Terminals 235, 236 and 237 represent the input terminals connected to the pickups or scanning devices for three adjacent primary channels. Each of these terminals is connected to the grid of an associated cathode follower including triodes 238, 239 and 240, respectively, the anodes of which are connected to the positive terminal +V of a source of direct current, the negative terminal of which is grounded. The cathodes of the triodes are connected to ground through resistors 241, 242 and 243, and the output is taken across these resistors in the usual manner. These cathode followers serve as isolation devices to prevent the subsequent circuitry from being influenced by adverse conditions which may exist in the input circuitry. The output from each of the cathode followers is supplied to an associated fast rise-slow fall integrating circuit which has an output cathode follower associated therewith for isolation purposes. Since this portion of the circuitry is similar for each primary channel, only the circuit associated with triode 239 will be described, it being understood that each of the other circuits is similar in construction and operation. As shown, the integrating circuit comprises two resistors 245 and 246 which are effectively connected in series with a capacitor 247, across the cathode resistor 242. A diode 248 is connected in series with resistor 246. Thus, for a transient in which the upper end of resistor 242 is relatively positive, the time constant for the integrating circuit is determined by the combination of resistor 245 in parallel with the forward resistance of diode 248 and resistor 246 in series, and the capacitance of capacitor 247. For a negative transient, the time constant is determined by the same combination, except that the reverse resistance of the diode is involved. Since the reverse resistance of the diode is many times greater than the forward resistance, it is apparent that the time constant for negative transients will be substantially greater than the time constant for positive transients, hence the integrator provides for fast rise and slow fall. The integrated voltage across capacitor 247 is supplied to the grid of cathode follower triode 250, the anode of which is connected to +V, and the cathode of which is connected to ground through the cathode resistor 251. The output of this cathode follower is supplied to the cathode of a clipping inverter triode 253 through a resistor 254. The outputs of the integrator cathode followers for the two adjacent channels are also fed to the cathode of triode 253 through resistors 256 and 257. Resistor 258 connects the cathode of triode 253 to a negative terminal of a direct current source −V which source has its positive terminal connected to ground. This resistor network forms a passive summing network so that, in effect, the integrated signals of the three channels are summed and supplied to the cathode of triode 253, so that the cathode voltage of this tube, with respect to ground, reflects the time integral of the signals on the immediate channel with which it is associated, as well as the integrated signals of the channels adjacent thereto on each side. The integrated signals supplied from each channel to the summing network is approximately equal to the average peak value of the input signals supplied from the scanning or sensing elements. It should be noted that the components of the adjacent channel signals supplied to the cathode of triode 253 are not necessarily equal to the values of the signal supplied from the immediate channel, since the amount of signal required from the adjacent channels may differ in accordance with the scanning techniques employed and the type of scanning information to be used.

The output across resistor 242 is supplied to the grid of clipping inverter triode 253 by a circuit comprising a voltage divider including a variable resistor 260 and a fixed resistor 261. It is apparent that the signal level at which triode 253 operates for the signals supplied to its grid is determined by the cathode voltage, so that the clipping of the signals is determined by the summed integrated voltages of the three adjacent channels. The variable resistor 260 is set so that triode 253 is cut off during a condition of no channel signal, and to conduct when a signal equal to or greater than one-half the minimum contrast range is supplied.

The anode of triode 253 is connected to +V through a plate load resistor 263 and the output of this tube is supplied to the grid of an output inverter tube 264 via the voltage divider including resistors 265 and 266, the latter being shunted by a capacitor 267, and through a limiting resistor 268. The cathode of triode 264 is connected to ground and the anode is connected to an output terminal 271, and to +V through a load resistor 272. The output inverter stage provides an amplified and inverted output signal from the clipping control triode.

It may be desirable in some instances to provide the adjacent channel signals, before integration, to the summing network, in which case the adjacent channel resistors in the summing network, such as resistors 256 and 257, would be connected across the resistors 241 and 243, instead of as shown. Also, combinations of the integrated and non-integrated adjacent channel signals could be used, by suitably modifying the summing network.

From the foregoing, it can be seen that the arrangement described provides a contrast clipping control which takes into consideration not only the immediate channel information, but also the information received on adjacent channels. Such an arrangement prevents the contrast threshold from lowering when the immediate channel is receiving no information, but one or the other or both of the adjacent channels is receiving information.

The embodiments previously shown and described utilize crossover counts, measurements of crossover lengths and the length of the area between crossovers as criteria for determining characters. However, other characteristics of the characters may also be employed, such as, for example, the relative position of the black components in each scan relative to the end of the scan. FIG. 11 illustrates one arrangement which may be employed for measuring the distance between the last black portion of a character and the left edge of the character or scanned area in which the characater is located. Such information can be divided into three categories, for example, depending on the distance, or since the scanning speed is constant, the time between the last black seen and the edge of the character or character area. The first category, which may be designated as PL0, includes these scans in which the last black occurs in coincidence with the left edge of the character, allowing for acceptable amounts of skew and break-ups of the edge of the character. The second category, which may be designated as PL1, includes those scans in which the last black occurs within a predetermined time from the left edge of the character space, but does not fall into the PL0 range. All scans which do not fall into the PL0 or PL1 range are designated as PL2. Thus, an X0 condition, where no black is seen during a scan, would also be coded as PL2.

These conditions are illustrated in FIG. 10, which shows the scanning of a numeral "3," the direction of relative motion of the numeral being to the right as indicated by the arrow, and the portions of the character which fall into the different edge coding ranges are indicated by the vertical lines, while the channels are indicated by the horizontal lines. Thus, it is seen that the left edges of the top and bottom loops of the character fall in range PL0, the middle bar falls in range PL1, and the remainder of the character falls in range PL2.

In implementing this arrangement, each of the secondary channels, in adidtion to the crossover counting and scanning circuits, as shown in FIG. 4, is provided with a suitable arrangement for measuring the time intervals from the last black until transfer pulse time, one possible arrangement being shown in FIG. 11. The digitalized output of the secondary channel, as supplied to line 46 in FIG. 4, is also supplied to the inputs of the time measuring circuits 275 and 276, the structure of which is the same in each case, so that a detailed description of one will suffice for both. The input is connected to the grid of a triode 278, the cathode of which is grounded and the anode of which is connected to +V through a load resistor 279. The grid of a second triode 281 is connected to the anode of triode 278 via a resistor 282 and capacitor 283 connected in shunt, and a timing capacitor 284 is connected between the anode of triode 278 and ground. The cathode of triode 281 is connected to a variable voltage divider so that the cathode potential may be set at a predetermined value between the potential —V and ground, while the anode of this tube is connected to +V through a load resistor 286. The anode of triode 281 is connected to the grid of an inverter triode 288 via the voltage dividing network including resistors 289 and 290, the capacitor 291 and limiting resistor 292. Triode 288 has the cathode connected to ground and the anode connected to +V through resistors 294 and 295, with the output circuit connected to the junction of resistors 294 and 295. The details of the circuitry of time measuring circuit 276 are the same as those described for circuit 275.

In operation, a black signal on line 46 causes triode 278 to conduct, discharging capacitor 284. At the end of the black signal, triode 278 cuts off, and capacitor 284 starts charging through resistor 279. During this time, triode 281 is cut off and the output of triode 288 is relatively negative since this tube is conducting. When the voltage on capacitor 284 rises to the value at which triode 281 conducts, as determined by the setting of resistor 285, the conduction of triode 281 will cut off triode 288, so that the output of triode 288 will go positive. The resistor 285 in circuit 275 is set so that the measured time interval corresponds to the range PL0, and the corresponding resistor in circuit 276 is set so that the measured time interval corresponds to PL1.

The outputs of the two time measuring circuits 275 and 276 are supplied to a pair of AND circuits 300 and 301, respectively, which are both governed by the transfer pulse from terminal 79 (TRFR). The outputs of these AND circuits are supplied to the inputs of a pair of storage devices, such as the triggers 303 and 305, which are normally reset by the reset pulse supplied from terminal 93 (R2).

If the time measuring circuits are providing a positive output at transfer pulse time, the outputs from switches 300 and 301 will set the associated triggers on. The combinations of conditions thus provided is determined by the AND circuits 307, 308 and 309, one input to these circuits being the read-out pulse supplied from terminal 101. If both triggers are off, an output is provided from AND circuit 307 to terminal 311 (PL0). If trigger 303 is on and trigger 305 is off, AND circuit 308 provides an output to terminal 313 (PL1), and lastly, if both triggers are on, AND circuit 309 provides an output to terminal 315 (PL2). These signals, derived for each of the secondary channels, may be analyzed by properly arranged sequence circuits, similar to those previously described, and used in conjunction with the X-coded signals for determining the character which has been scanned.

It can be seen from the foregoing description that one or more sets of conditions or recognition criteria may be employed in the present invention to analyze the scanning information to thereby determine the identity of the scanned characters.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A character recognition system comprising, a plurality of scanning elements arranged along a line for providing a plurality of adjacent parallel and concurrent scans of a character to be identified, a plurality of primary scanning channels, one for each of said scanning elements for receiving information therefrom, the number of said scanning elements and said primary channels being equal to the number of elements required to scan a character of predetermined maximum dimension transverse to the motion of scanning pulses plus a predetermined maximum misalignment tolerance, a plurality of secondary channels, equal in number to the number of primary elements and primary channels required to span a character of said predetermined maximum dimension plus one additional phasing channel, channel reduction circuit means for connecting said primary channels to said secondary channels in repeated ordered sequences, said secondary channels being connected in order to primary channels spaced apart by a number equal to the number of said secondary channels, and means for analyzing the information received on said secondary channels, whereby the scanning information received on the primary channels is supplied to the secondary channels regardless of the location of the scanning information in said primary channels, within said misalignment tolerance.

2. A character recognition system comprising a plurality of scanning elements arranged along a line for providing a plurality of adjacent parallel and concurrent scans of a character to be identified, a plurality of primary scanning channels, one for each of said scanning elements for receiving information therefrom, the number of said scanning elements and said primary channels being equal to the number of elements required to scan a character of predetermined maximum dimension transverse to the motion of scanning plus a predetermined maximum misalignment tolerance, a plurality of secondary channels equal in number to the number of primary elements and primary channels required to span a character of said predetermined maximum dimension plus one additional phasing channel, channel reduction circuit means for connecting said primary channels to said secondary channels in repeated ordered sequences, said secondary channels being connected in order to primary channels spaced apart by a number equal to the number of said secondary channels, encoding means for each of said secondary channels for developing recognition criteria from the information derived from each scan, storage means connected to said encoding means for storing said recognition criteria for each scan, sequence analysis circuit means connected to said storage means and responsive to predetermined sequences of recognition criteria for developing an output signal indicative of the characters represented by the sequences, and readout control means for sequentially connecting said storage means to said sequence analysis circuit means, whereby the characters are properly analyzed irrespective of their misalignment, within said maximum misalignment tolerance.

3. In a character recognition system, a plurality of parallel scanning elements arranged along a line transverse to the relative motion of the character to be recognized, the number of said scanning elements being equal to the number of adjacent scans required to completely scan a character of predetermined maximum height plus the equivalent predetermined misalignment distance, a plurality of primary channels, one for each of said scanning elements and connected thereto to receive scanning information, a plurality of secondary channels, equal in number to the number of primary channels required to span a character of predetermined maximum height plus one additional channel for phasing purposes, channel reduction circuit means for connecting said secondary channels to said primary channels in repeated ordered sequences whereby each secondary channel receives information from primary channels spaced apart by a number equal to the number of secondary channels, encoding means for each of said secondary channels and connected thereto for developing recognition criteria in accordance with the scanning information, said recognition criteria comprising the number of character areas encountered during a scan and the length thereof, storage means for each secondary channel connected to said encoding means for storing the recognition criteria developed during the scan, sequence analyzing means, one for each set of sequences of said criteria which defines a character to be recognized, and readout control means for sequentially connecting said storage means for each secondary channel to said sequence analyzing means, whereby the characters are properly analyzed irrespective of their misalignment, within said maximum misalignment tolerance.

4. In a character recognition system, the combination comprising parallel scanning means for scanning each character to be recognized in a plurality of adjacent and concurrent scans, encoding means connected to said scanning means for developing a plurality of recognition criteria from the scanning information, including the number of character areas, and the length of character areas and non-character areas, storage means connected to said encoding means for storing the various recognition criteria during each scan, and a plurality of sequence analyzing circuit means, one for each character to be recognized, and readout control means for sequentially connecting said storage means to said sequence analyzing circuit means, said sequence analyzing circuit means each comprising a plurality of cascade connected bistable elements arranged so that the elements are successively rendered effective by a predetermined sequence of said recognition criteria supplied thereto from said storage means.

5. In a character recognition system, the combination comprising a plurality of parallel scanning elements arranged to provide a plurality of adjacent and concurrent scans through characters to be recognized, encoding means connected to said scanning elements for developing a plurality of recognition criteria for each of said scans, intermediate storage means connected to said encoding means for storing said recognition criteria for each scan, a set of common busses, one for each class of recognition criteria, readout control means effective when operative to sequentially connect said intermediate storage means to said common busses, sequence analysis means, one for each character to be recognized, connected to said common busses, each said sequence analysis means providing an output signal when and only when a specific sequence of criteria is supplied thereto, a plurality of output storage devices, one for each character to be recognized, connected to the output of the corresponding sequence circuit means, a plurality of output control switches, one for each of said output storage devices, effective when rendered energized to connect said output storage devices to corresponding output terminals, and checking circuit means for determining the condition of said output storage means and effective to energize said control switches when one and only one of said output storage devices has information stored therein.

6. In a character recognition system, the combination comprising a plurality of parallel scanning elements arranged to provide a plurality of adjacent and concurrent scans through characters to be recognized, encoding means connected to said scanning elements for developing a plurality of recognition criteria for each of said scans, intermediate storage means connected to said encoding means for storing said recognition criteria for each scan, a set of common busses, one for each class of recognition criteria, readout control means effective when operative to sequentially connect said intermediate storage means to said common busses, sequence analysis means, one for each character to be recognized, connected to said common busses, each said sequence analysis means providing an output signal when and only when a specific sequence of criteria is supplied thereto, a plurality of output storage devices, one for each character to be recognized, connected to the output of the corresponding sequence circuit means, a plurality of output control switches, one for each of said output storage devices, effective when rendered energized to connect said output storage devices to corresponding output terminals, and checking circuit means for determining the condition of said output storage means and effective to disable said output control switches when said output storage means contains no information.

7. In a character recognition system, the combination comprising a plurality of scanning elements arranged to provide a plurality of adjacent and concurrent scans through characters to be recognized, encoding means connected to said scanning elements to derive recognition criteria from the scanning information supplied thereto from said scanning elements, said encoding means including means for determining the distance from the last portion of a character seen during a scan to a boundary of the scanned area, storage means connected to said encoding means for storing the recognition criteria developed for each scan, and means connected to said storage means for sequentially analyzing said recognition criteria for sequences indicative of the character scanned.

8. In a character recognition system, the combination comprising a plurality of scanning elements for scanning characters to be recognized in a plurality of adjacent and concurrent scans, encoding means connected to said scanning means for developing recognition criteria from the information supplied by said scanning elements during each scan, said encoding means including means for determining whether or not the distance from the last portion of a character seen during a scan to the boundary of the scanning area falls within a predetermined range, storage means connected to said encoding means for storing said recognition criteria, sequence analyzing means, and readout control means effective when rendered operative to sequentially connect said storage means to said sequence analyzing means to determine whether or not a sequence of said recognition criteria representing a character has been stored in said storage means.

9. In a character recognition system, the combination comprising a plurality of scanning elements for scanning each character to be recognized in a plurality of adjacent and concurrent scans, encoding means connected to said scanning means for deriving recognition criteria from information supplied thereto from said scanning elements during each scan, said encoding means including time measuring means for determining if the time between the scanning of the last portion of a character and the arrival at the boundary of the scanning area falls in a first, a second or a third predetermined range, storage means connected to said encoding means for storing the recognition criteria developed by said encoding means, sequence analyzing means, one for each character to be recognized and effective to provide an output signal indicative of the associated character when a sequence of recognition criteria corresponding to the associated character is supplied thereto, and readout control means effective when rendered operative to sequentially connect said storage means to said sequence analyzing means.

References Cited in the file of this patent

UNITED STATES PATENTS

| | | |
|---|---|---|
| 2,460,702 | Mallery | Feb. 1, 1949 |
| 2,538,150 | Faruham | Jan. 16, 1951 |
| 2,616,983 | Zworykin | Nov. 4, 1952 |
| 2,682,573 | Hunt | June 29, 1954 |
| 2,774,865 | Cope | Dec. 18, 1956 |
| 2,838,602 | Sprick | June 10, 1958 |
| 2,842,663 | Eckert | July 8, 1958 |
| 2,844,721 | Minkow | July 22, 1958 |
| 2,881,976 | Greanias | Apr. 14, 1959 |
| 2,889,535 | Rochester | June 2, 1959 |
| 2,894,247 | Relis | July 7, 1959 |
| 2,905,930 | Golden | Sept. 22, 1959 |
| 2,932,006 | Glauberman | Apr. 5, 1960 |
| 2,939,124 | Saxenmeyer | May 31, 1960 |

OTHER REFERENCES

"Character Recognition," Electronics, February 1956, pp. 132–136.